April 10, 1951     S. P. TAUBER     2,548,177
MELTER
Filed Jan. 10, 1948     3 Sheets-Sheet 1
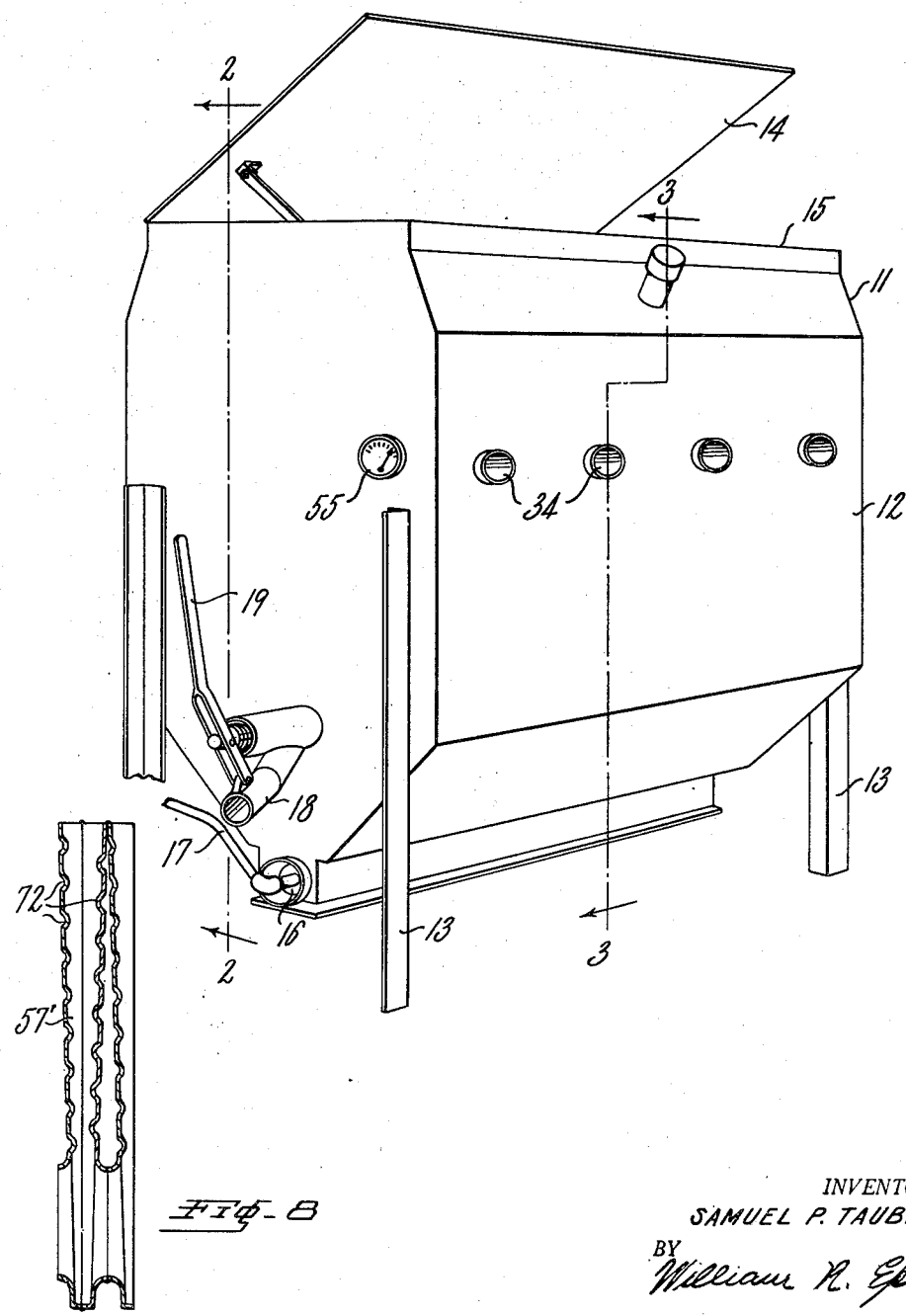
INVENTOR.
SAMUEL P. TAUBER
BY
William R. Epes
ATTORNEY

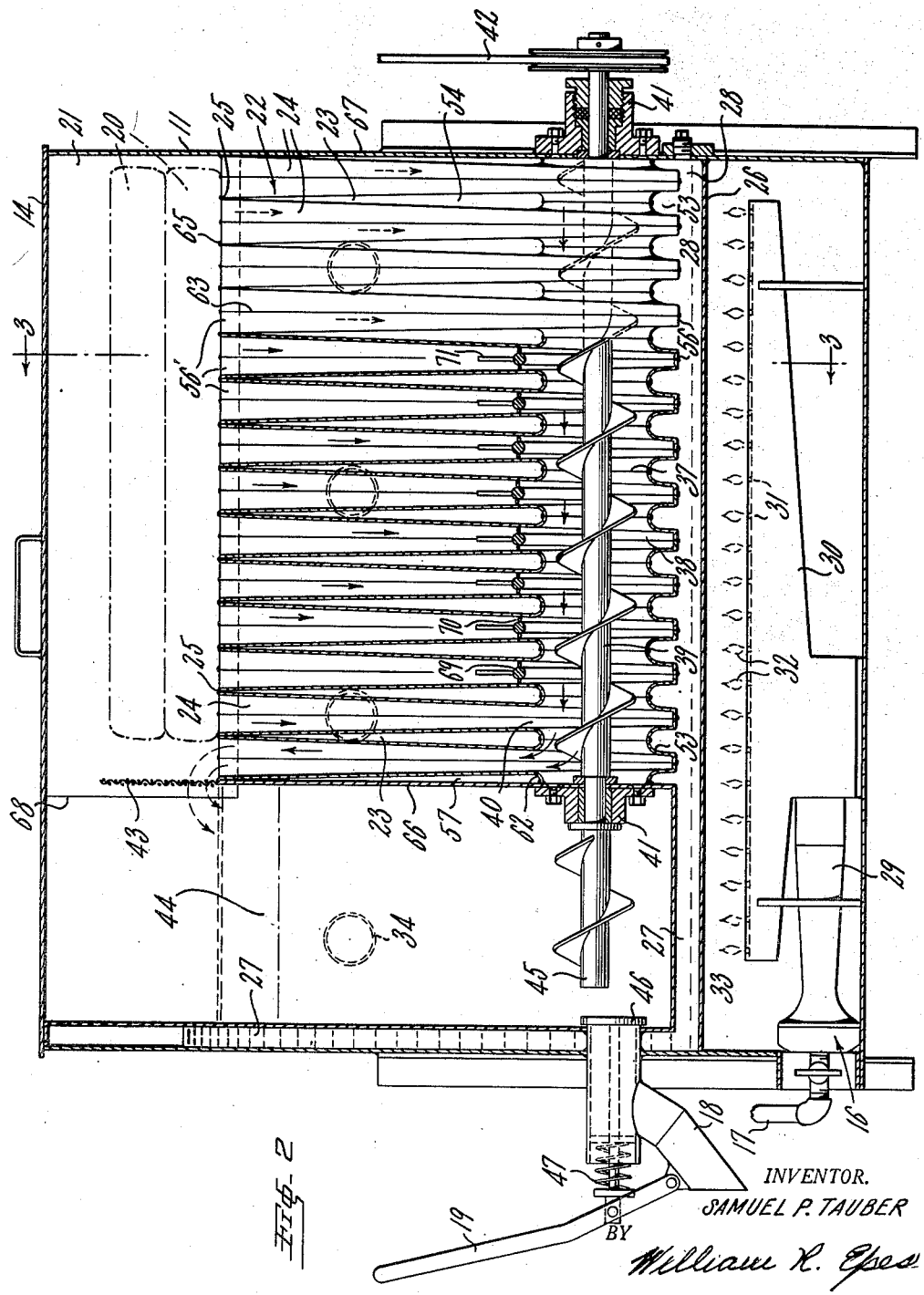

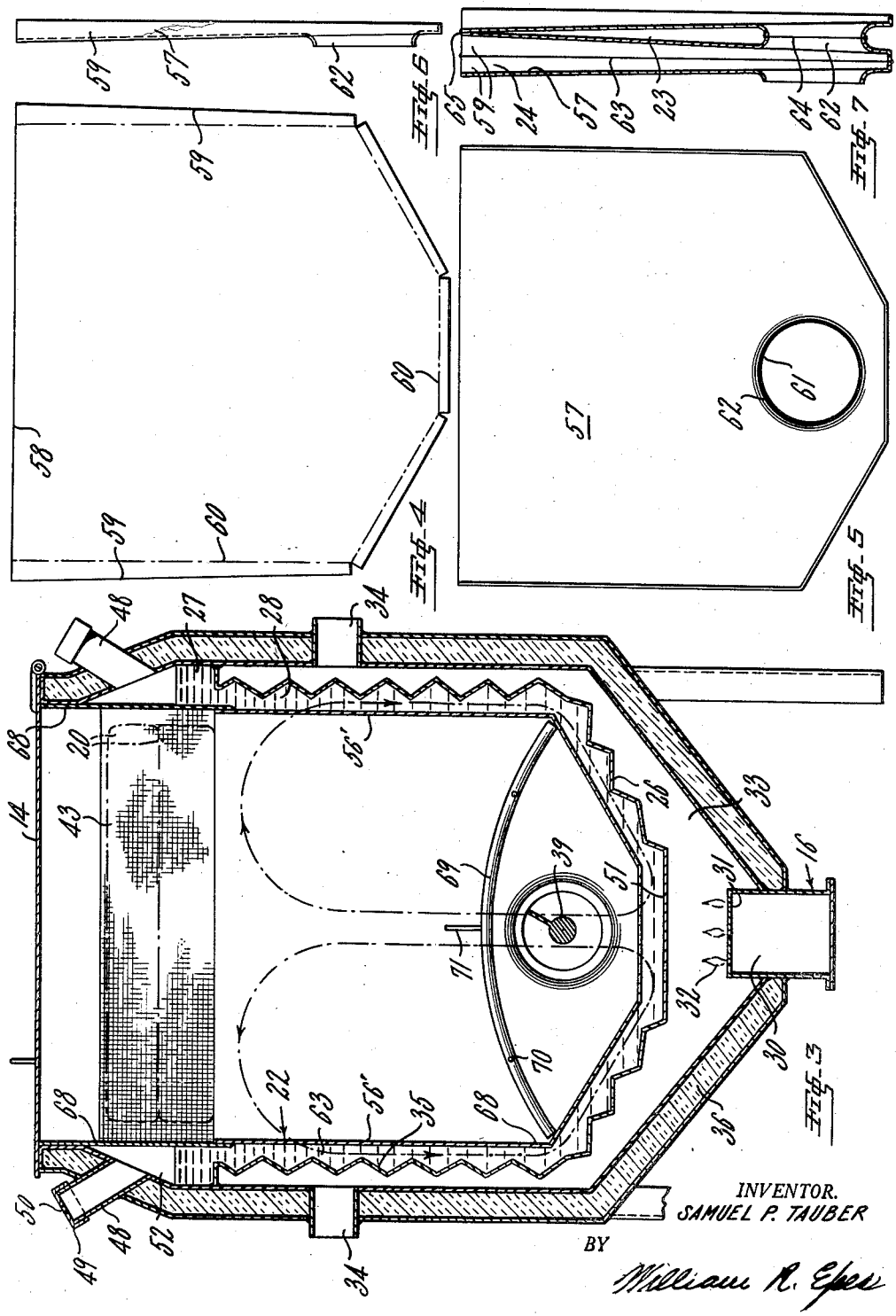

Patented Apr. 10, 1951

2,548,177

UNITED STATES PATENT OFFICE 2,548,177

MELTER

Samuel P. Tauber, New York, N. Y., assignor to United States Rubber Company, New York, N. Y., a corporation of New Jersey Application January 10, 1948, Serial No. 1,561

10 Claims. (Cl. 126—343.5)

This invention relates to an improved melting apparatus, and particularly to a light weight or portable apparatus for quickly melting thermoplastic materials having low heat conductivity, and subject to being scorched or burned at temperatures above their melting points.

The apparatus embodying this invention is particularly useful for melting relatively large bodies of such thermoplastic materials which are difficult to melt and cannot conveniently be supplied to the melter in subdivided parts, because of their tendency to coalesce into a single body when the parts are brought into contact with each other. An example of such material is a mixture of asphalt and rubber which is used to seal cracks and separations in concrete slabs of roadways, airplane landing strips, and other paved surfaces. In such use the material is solid at normal temperatures and before it can be utilized, it must be melted to a liquid state. The melted material is then poured into the crevices and permitted to solidify for the purpose of sealing them against the entry of water, which may freeze in the crevices during cold weather and break up the pavement. To meet the requirements of melting apparatus for the above purpose, the apparatus should be relatively light to render it portable, and yet have sufficiently rapid melting rate to reduce the time to a minimum for supplying the initial melted batch of material, and to thereafter produce a continuous supply of the melt.

Due to the tendency of the material to coalesce into a single body, and also due to its low heat conductivity, difficulty has been experienced in causing the heat to penetrate into the body of the material at the rate and in sufficient quantities to rapidly melt it. The rapidity with which the material can be melted is also limited by its tendency to scorch when it is subjected to high temperatures. The problems of melting this low heat conductive and scorchable thermoplastic material have been attacked in two ways. The bodies of coalescent material have been sub-divided by forcing it through heated passages under pressure supplied by auxiliary presses, so as to present larger areas and new surfaces of the material to the heating surfaces, and thereby increase the speed of melting, but the auxiliary equipment required to produce good results decreases the portability of the apparatus and increases its cost. The problems have also been attacked by increasing the size of the melting unit to obtain greater heating surfaces, but without providing efficient means for sub-dividing the solid material to be melted and causing it to move over the surfaces of the heating grid. In either case the increase in the rate of melting was accompanied by a decrease in the portability and an increase in the cost of the apparatus.

In accordance with the present invention a decrease in the weight or an increase in the portability of the apparatus per unit rate of melting is obtained by providing a novel and efficient heating grid having a relatively large heating surface arranged in a compact space, and which is so constructed that it utilizes the laws of nature to sub-divide the body of coalesced material to be melted, and to convey the sub-divided parts over the heating surface of the grid without the use of any auxiliary apparatus. To prevent the material to be melted from being scorched, the grid is uniformly heated by circulating a high boiling point temperature controlled liquid heating medium, such as oil, in contact with the under-side of the grid. The heating medium is contained in a tank which encloses the grid, and the liquid is circulated by convection currents produced by heating the bottom of the tank. The natural laws of nature are thereby utilized for circulating the liquid, and the use of auxiliary pumping apparatus for such purpose is thereby avoided.

In order to prevent the hazard of explosions which have heretofore resulted from the sudden conversion of water into steam within the body of oil which may have entered the tank by accident, or natural condensation from the atmosphere upon cooling of the apparatus while it is not in use, a gas flame for heating the oil is applied to the lowest point of the tank directly above the accumulation of the water. The heat of the flame evaporates and drives the water off before the oil reaches a temperature materially higher than the boiling point of the water, and thus the sudden conversion of the water into steam is prevented when the apparatus is being put into operation.

The present apparatus has the further advantage of having the surfaces of the heating grid arranged so that they are easily accessible for cleaning coked particles of the melt therefrom, which may have been deposited thereon.

Other objects and advantages of this invention will be more clearly understood by referring to the following description and the accompanying drawings, in which:

Fig. 1 is a perspective view of a melter embodying this invention;

Fig. 2 is an enlarged cross-sectional view of the apparatus taken longitudinally therethrough substantially on line 2—2 of Fig. 1, but showing a portion of the heating grid in elevation;

Fig. 3 is an enlarged cross-sectional view of the apparatus taken transversely thereof on line 3—3 of Fig. 1;

Fig. 4 is a plan view of a flat blank of an element of the heating grid of which the grid is formed by an assembly of such parts;

Fig. 5 is a plan view of a finished element formed from the blank shown in Fig. 4;

Fig. 6 is an end view of the element shown in Fig. 5;

Fig. 7 is a cross-sectional view of three of the elements shown in Fig. 6, as they appear when assembled in the heating grid; and Fig. 8 is a cross-sectional view of a portion of a modified form of a heating grid element similar to the view in Fig. 7, but having projections thereon to increase the effective heating surfaces of such elements.

The melter embodying this invention is described in reference to the portable unit which may be mounted on wheels (not shown) and transported from location to location where the crevices in concrete pavements are to be filled with the material to be melted in the unit. The melter 11 comprises an outer casing 12 which is supported on legs 13. The casing is provided with a top cover 14 which may be opened, and the material to be melted is placed into the melting chamber through the top opening 15 of the casing underneath the cover 14. The heat for melting the material is furnished by a gas burner 16 to which gas is supplied through a pipe 17. The melted material is drawn from the melter 11 through a spout 18, and the flow of the melted material therethrough is controlled by a manually operated handle 19 which actuates a valve in the casing 12 for cutting off or admitting the flow of fluid to the spout 18.

The bodies of material to be melted may be supplied in large bags which are removed from the bodies prior to placing them in the melter. As shown in Fig. 2, the striped slab shaped bodies 20 of material to be melted are placed in the melting chamber 21. One or more of the bodies 20 may be retained in the melting chamber 21 at the same time, and they are supported by a heating grid 22, comprising hollow heating units 23 having outer heating surfaces which form compartments 24 for receiving and heating the thermoplastic material which is sub-divided from the bodies 20. The heating units 23 terminate at their upper ends in relatively narrow cutting edges 25 upon which the lower body 20 of thermoplastic material is supported in direct contact therewith. The material in contact with the hot edges is melted and the weight of the material above the edges forces it downwardly over the edges and sub-divides it into sections, which flow downwardly into the material compartments 24. Since the sub-division of the bodies 20 is facilitated by the force with which it is pressed against the cutting edges 25, it is desirable to pile several slabs, one on top of the other, into the melting chamber 21, in order to increase the pressure on the edges 25.

The heating grid 22 is enclosed in an outer tank 26, and it is heated by hot oil 27 contained in the space 28 between the tank 26 and the grid 22. The oil 27 has a high vaporizing temperature and is heated by the gas burner 16, comprising a mixer 29 and a distributing chamber 30 having orifices 31 therein, which supplies the mixed gas to the flame 32, which heats the bottom of the container 26 and the liquid heating medium of oil contained therein. As shown best in Fig. 3, the combustion gases flow upwardly through the combustion chamber 33, and around the oil containing tank 26, and outwardly through discharge openings 34. For the purpose of increasing the heating efficiency of and reducing stresses in the tank walls resulting from expansion and contraction, the walls of the tank 26 are provided with corrugations 35 in the areas contacted by the hot combusion gases. The outer walls of the combustion chamber 33 are insulated with a heat insulating material 36.

Referring to Fig. 2, as viewed in logitudinal cross-section of the melter 11, the walls of the heating units 23 diverge downwardly and the outer surfaces of the opposite adjacent heating units form converging walls or heating surfaces of the melting compartments 24. Sealed tunnels 37 through each of the heating units 23 form a longitudinal passage 38 which is connected to each of the melting compartments 24. A combined mixer and conveyor screw 39 extends through the passageway 38, and it agitates the melted material therein, which has been discharged through the narrow openings, or throats 40, which lead from the bottom of the melting compartments into the passageway. The conveyor screw 39 is mounted in bearings 41 located at each end of the melting grid 22, and it is driven through a pulley and belt drive 42 by a prime mover, such as a small gasoline engine (not shown). The divided sections of the thermoplastic material 20 and the melt therefrom flow downwardly through the melting compartments 24 as indicated by the downwardly pointing arrows in Fig. 2. Some of the semi-melted together with the melted material passes through the throats 40. The screw mixes the unmelted or semi-melted material with the melted material and aids the production of a homogeneous melted mass. The screw forces such material along the passage to the left as viewed in Fig. 2, and discharges it upwardly through the last melting compartment at the end of the grid 22 as indicated by the horizontal and vertical arrows. The bodies 20 of plastic material to be melted do not cover the opening at the top of this last compartment, and the melted material can therefore pass therethrough, and over its top edge and through a screen 43 into a holding reservoir 44 which is jacketed by the hot oil 27 contained within the tank 26. An end 45 of the screw 39 projects into the reservoir 44 and keeps the liquid material therein agitated. The reserved supply of melt in the reservoir 44 may be discharged therefrom through the spout 18 by unseating the valve 46 upon manually operating the handle 19 against the seating action of the coil spring 47.

The oil reservoir 28 is filled with oil 27 through an inlet 48 provided with a cap 49 having an atmospheric vent 50 therein. The oil reservoir 28 is provided with a trough like bottom forming the lowest point of the reservoir. The heating flame is positioned directly under the bottom of the trough 51, and upon starting the flame this portion of the reservoir is first heated. In the event any water is contained in the oil, it will be converted into steam or vapor and driven out of the reservoir through the vent 50, or into the space above the oil level before the body of the oil reaches a temperature materially above the boiling point of the water. The sudden conversion of the water into steam, which might cause explosions, is thereby prevented.

As shown in Fig. 2, the hollow interiors of the heating units 23 are open to the oil reservoir 28 at their bottoms 53 and ends 54. Due to this construction, as the oil is heated, it can freely circulate by convection upwardly into the hollow portions of the unit 23 and laterally and outwardly through the ends of the unit, as indicated by the dotted arrows in Fig. 3. An efficient circulation of the heating medium in contact with the heating grid 22 is thus obtained without using any auxiliary pumping apparatus, which would otherwise increase the weight of the melting unit. As shown in Fig. 1, a thermometer 55 is provided for indicating the temperature of the oil in the reservoir 28, and it is also evident that a thermostat may also be provided for automatically controlling the temperature of the heating oil by regulating the flame 32 produced by the gas burner 16. By so controlling the temperature of the heating oil and the efficient circulation thereof in contact with the heating grid, the scorching of the melt may be prevented. It will be also noted by the construction of the grid 22, a large area of heating surface is exposed to the material on one side and to the heating oil on the other. The grid is made of relatively thin and high heat conductive metal, and the heating oil being rapidly circulated in contact therewith, an efficient heating unit is provided which is relatively light and portable, and is adapted to rapidly melt the thermoplastic material 20.

The heating grid 22 is generally of a corrugated shape, as shown in cross-section in Fig. 2, in which the ridges of the corrugations extend laterally thereof, and the depth of the valleys between the ridges is vertical. The upper ridges of the corrugations form the hot cutting edges 25, and the end of the valleys, or corrugations between such edges 25, are closed by end walls 58' to form the individual melting compartments 24. The valleys formed between the lower adjacent ridges 56 constitute the hollow portions of the heating units 23. Such valleys, or corrugations are not closed laterally at their ends and consequently the heating oil is free to enter the bottom of the heating units and flow upwardly and outwardly through the end of such corrugations or heating units 23 as indicated by the dot and dash arrows in Fig. 3.

The corrugated construction of the heating grid may be made from individual metal plates 57, as shown in Figs. 4 to 7. Each of the plates 57 are made from blanks 58 cut from flat sheet of metal in the shape as laid out in Fig. 4. The bottom of the blank 58 is cut on a downwardly converging angle so that its bottom will parallel the trough form of the bottom of the oil reservoir 28. The margin 59 of the ends and the trough shaped bottom of the blank 58 are turned upwardly at substantially right angles along the dot and dash lines 60, and the margin of the blank is formed into the shape shown in Fig. 5. Preferably before the edges 59 of the blank are turned upwardly, a round opening 61 is punched into the central bottom portion of the blank, and the margin 62 of the opening is bent out of the plane of the blank in the opposite direction from the upturned margin 59. Each of the upwardly turned margins 59 and the oppositely bent margins 62 of the openings 61, respectively form one-half of the end walls 58 of the melting compartments 24, and one-half of the tunnel 37 between such compartments, when the plates 57 are assembled in the heating grid 22. The grid 22 is constructed by arranging the plates with upper edges in contact and with the edges of their respective upturned margins 59 and their oppositely bent margins 62 abutting against each other, as shown by three of such plates 57 in Fig. 7. The abutting edges of the margins 59 are united together along the line 63, as by welding, to form the melting compartments 24. The abutting edges of the outwardly bent margins 62, and the contacting upper edges of the plates are welded together along the lines 64 and 65 to form the heating units 23 between each of the compartments 24. The united outwardly bent margins 62 form a passageway between the respective melting compartments. The grid 22 is built up as thus described until as many heating units 23 and melting compartments 24 are formed as may be desired, but leaving an outwardly projecting margin 62 at each end of the grid, so that a full size melting compartment may be formed at each of the grid ends. As shown in Fig. 2 the upwardly bent margins 59 and oppositely bent margins 62 are united to plates 66 and 67 to close off the ends of the grid, and thereby form a half section of a heating unit at each of the ends.

After the grid 22 has been thus formed, a side plate 68 is welded along each side of the heating grid along its top edge for the purpose of forming the melting chamber 21 above the grid to receive the plastic material to be melted. The grid 22 is suspended into the oil reservoir 28 by welding the top edges of the plate 68 to the top of the reservoir. The opening between the plates 68 at one of their ends is closed by welding the ends of the plates to the end plate 67. The lower edges of the opposite ends of the plates 68 are welded to the cross plate 66, and the wire screen 43 extends between and is secured to the ends of the plate 68, and to the top of the plate 66.

In the event the sub-divided sections of the plastic material flow downwardly through the melting compartments 24 too rapidly and enter the passageway 38 at the bottom of the compartments before such sections are sufficiently melted, bent rods 69 are placed in the bottom of the melting compartments to restrict the flow of the plastic material therethrough. The diameter of the rods 69 is less than the width of the melting compartment to permit the plastic material to pass to either side. The rods 69 are centered in the compartments by projections 70 on the rod which extend between the rod and the side wall of the compartments, so as to form a space between the rod and the side walls of the compartments 24. The rods 69 are supported by their ends resting upon the top of the troughed bottom of the compartment as shown in Fig. 3. The rods are provided with a projection 71, which may be grasped with a pair of tongs for the purpose of inserting and removing the rods 69 from the compartments as may be desired. The rods 69 have the further function of dividing the semi-melted sections of plastic and holding them against the hot surfaces of the grid 22, which increases the melting efficiency.

The flow of the thermoplastic material downwardly through the melting compartments 24 may also be restricted by forming projections on the heating surfaces of the grid which extend into the melting compartments. Such projections 72 are shown on the surface of the grid plate 57' in Fig. 8. They may be made by pressing the metal outwardly opposite the places where the projections are to be formed. The projections 72 also increase the heating efficiency of the grid 22 due to the increase in the heating area resulting therefrom.

While the preferred form of this invention has been described herein more or less in detail, it will be understood that changes in the construction may be made without departing from the spirit of the invention or the scope of the appended claims.

Having thus described my invention, what I claim and desire to protect by Letters Patent is:

1. A melter comprising a heating grid, an outer tank enclosing said grid and adapted to retain a heating medium in contact therewith, means for heating the bottom of said tank under said grid, said grid comprising a plurality of heating units terminating at their upper ends in narrow cutting edges and having open bottoms and ends in free communication with said tank, whereby the flow of heating medium may be maintained upwardly and laterally towards each end of said unit, and intercommunicating melting compartments formed by the upper surface of said grid and interposed between said heating units.

2. A melter comprising a heating grid, an outer tank surrounding said grid and adapted to retain a heating medium in contact therewith, said grid comprising a plurality of elongated wedge-shaped heating units, the top of the walls of the same heating unit terminating in relatively narrow cutting edges, melting compartments formed by the opposite walls of adjacent heating units, the walls of each heating unit having a sealed tunnel extending therebetween and forming a passageway communicating with the bottom of said melting compartments, and means for drawing off the melt from the bottom of said compartments through said passageway.

3. A melter comprising a heating grid, an outer tank surrounding said grid and adapted to retain a heating medium in contact therewith, said grid comprising a series of elongated wedge-shaped heating units, the top of the adjacent walls of said heating units terminating in relatively narrow cutting edges, melting compartments formed by the opposite walls of adjacent units, the walls of each heating unit having a sealed tunnel extending therebetween and forming a passageway communicating with the bottom of said melting compartments, a reservoir positioned at the end of said series of heating units for receiving the melt from said compartments, and means for forcing the melt from the bottom of said compartments through said passageway and over the top of an end heating unit into said reservoir.

4. A melter comprising a heating grid, an outer tank enclosing said grid and adapted to retain a heating medium in contact therewith, said grid comprising a plurality of heating units having side walls terminating at their upper extremities in narrow cutting edges, said heating units having their bottoms and ends in free communication with said tank, melting compartments formed by the upper surface of said grid and interposed between said heating units, a reservoir heated by the heating medium, said side walls of each heating unit having a sealed tunnel extending therebetween and forming a passageway connecting the bottoms of said compartments, and a conveyor screw for agitating the melt and forcing it from said compartments into said reservoir.

5. A melter comprising a heating grid forming the bottom portion of a melting chamber, said grid having a wall provided with a series of corrugations therein, the upper surface of said corrugations having downwardly converging sides and closed ends and bottoms adapted to form melting compartments, and the under surface of said corrugations having converging sides between which are formed spaces which are closed in the upward direction by the apices of said corrugations but are open downwardly and in the lengthwise direction of said corrugations into a reservoir for a heating medium, the walls of the adjacent of said melting compartments having sealed tunnels extending therebetween and forming a communicating passage between all of said melting compartments, and a conveyor screw rotatably mounted in said passage for agitating the melt in said compartments.

6. A melter comprising a heating grid forming the bottom portion of a melting chamber, a tank forming in conjunction with said grid a reservoir for a liquid heating medium which is adapted to be maintained in contact with the under surface of said grid, said grid having a wall provided with a series of corrugations therein, the upper surface of said corrugations having downwardly converging sides and closed ends and bottoms adapted to form melting compartments, and the under surface of said corrugations having upwardly converging sides between which are formed spaces which are closed in the upward direction by the apices of said corrugations but are open downwardly and in the lengthwise direction of said corrugations into said reservoir for a heating medium, the opposite sides of said melting compartments having apertures formed therein, the rims of said apertures being bent outwardly into the space for said heating medium, the adjacent of said rims being united to form a communicating passage between said compartments, and a conveyor screw rotatably mounted in said passage for agitating the melt in said compartments.

7. A melter comprising a heating grid forming the bottom portion of a melting chamber, said grid having a wall provided with a series of corrugations therein, a tank enclosing said grid and forming in conjunction therewith a reservoir for a heating medium between said tank and said grid, the upper surface of said corrugations having downwardly converging sides and closed ends and bottoms adapted to form a series of melting compartments, and the under surface of said corrugations having upwardly converging sides between which are formed spaces which are closed in the upward direction by the apices of said corrugations but are open downwardly and in the lengthwise direction of said corrugations into said reservoir, a reserve reservoir at one end of the series of melting compartments, the walls of the adjacent of said melting compartments having sealed tunnels extending therebetween and forming a communicating passage between all of said compartments, and a conveyor screw rotatably mounted in said passage for agitating the melt in said compartments, and forcing it over the side of an end compartment into said reserve reservoir.

8. A melter comprising a heating grid, an enclosure for said grid adapted to retain a heating medium in contact therewith, said grid comprising a plurality of plates which are united together to form a corrugated structure, each of said plates having upturned side and bottom edges which are united to the corresponding edges of another plate to form melting compartments, the bottom of each of said plates having an aperture therein, the margin of said aperture being bent outwardly on the opposite side of said plate from said upturned edges, and said margins of said apertures extending from adjacent compartments being united together to form a passage extending between said compartments.

9. A melter comprising a heating grid, a tank enclosing said grid and adapted to retain a high boiling point heat transfer liquid for heating said grid, said tank having a depression in its bottom at the lowest portion thereof for collecting lower boiling point liquids, and means for directly heating said depression with the direct most intense heat of a gas flame adapted to be directed on said tank so as to heat said heat transfer liquid and evaporate any heavier but lower boiling point liquid that may be contained in said depression before the body of said heat transfer liquid is raised to a temperature above the boiling point of the lower boiling point liquid.

10. A melter comprising a heating grid, said grid comprising a plurality of heating units having upwardly converging walls terminating in narrow cutting edges, said units being spaced from each other and said walls of the adjacent units forming downwardly converging walls of melting compartments, said cutting edges being adapted to support thermoplastic material thereon, means for heating the walls of said heating units and causing the thermoplastic material to melt and flow downward between the converging walls of said compartments, and a bar positioned in and lengthwise of selected compartments between their walls near the bottom thereof to restrict the downward flow of incompletely melted material.

SAMUEL P. TAUBER.

REFERENCES CITED

The following references are of record in the file of this patent:

UNITED STATES PATENTS

| Number | Name | Date |
|---|---|---|
| 553,401 | VonGarnier | Jan. 21, 1896 |
| 665,157 | Zetelle | Jan. 1, 1901 |
| 830,305 | Cruise | Sept. 4, 1906 |
| 950,413 | Stedman et al. | Feb. 22, 1910 |
| 1,021,781 | Kingsley | Apr. 2, 1912 |
| 1,050,889 | White | Jan. 21, 1913 |
| 1,204,400 | Brauninger | Nov. 14, 1916 |
| 1,389,637 | Field | Sept. 6, 1921 |
| 1,574,489 | Kittel | Feb. 23, 1926 |
| 1,751,713 | Pellerin | Mar. 25, 1930 |
| 1,903,504 | Deck | Apr. 11, 1933 |
| 2,041,359 | Littleford, Jr. | May 19, 1936 |
| 2,130,455 | Cain | Sept. 20, 1938 |
| 2,227,845 | Rogers | Jan. 7, 1941 |
| 2,439,367 | Middlestadt | Apr. 6, 1948 |
| 2,476,431 | Root, Jr. | July 19, 1949 |

FOREIGN PATENTS

| Number | Country | Date |
|---|---|---|
| 28,241 | Germany | Aug. 6, 1884 |
| 700,805 | France | Jan. 2, 1931 |